(12) United States Patent
Laamanen et al.

(10) Patent No.: US 8,731,003 B2
(45) Date of Patent: May 20, 2014

(54) METHOD AND ARRANGEMENT FOR ADJUSTMENT OF A CLOCK SIGNAL

(75) Inventors: Heikki Laamanen, Espoo (FI); Markus Hurme, Helsinki (FI); Kenneth Hann, Espoo (FI); Jonas Lundqvist, Espoo (FI)

(73) Assignee: Tellabs Oy, Espoo (FR)

( * ) Notice: Subject to any disclaimer, the term of this patent is extended or adjusted under 35 U.S.C. 154(b) by 568 days.

(21) Appl. No.: 12/688,022

(22) Filed: Jan. 15, 2010

(65) Prior Publication Data

US 2010/0183036 A1 Jul. 22, 2010

(30) Foreign Application Priority Data

Jan. 16, 2009 (FI) ..................................... 20095039

(51) Int. Cl.
*H04J 3/06* (2006.01)
(52) U.S. Cl.
USPC ........................................................ 370/507
(58) Field of Classification Search
USPC ................. 370/324, 350, 503, 507, 509–514, 370/516–519
See application file for complete search history.

(56) References Cited

U.S. PATENT DOCUMENTS

| | | | | |
|---|---|---|---|---|
| 3,597,552 | A * | 8/1971 | Goto | 370/505 |
| 4,075,428 | A * | 2/1978 | Ghisler et al. | 370/503 |
| 5,483,523 | A * | 1/1996 | Nederlof | 370/394 |
| 5,566,180 | A * | 10/1996 | Eidson et al. | 370/473 |
| 7,404,023 | B1 * | 7/2008 | Kaszynski | 710/240 |
| 2003/0059160 | A1 | 3/2003 | Rikitake et al. | |
| 2004/0062278 | A1 | 4/2004 | Hadzic et al. | |
| 2005/0135530 | A1 | 6/2005 | Joo et al. | |
| 2010/0118711 | A1 * | 5/2010 | Cankaya et al. | 370/248 |

FOREIGN PATENT DOCUMENTS

| | | |
|---|---|---|
| CN | 1454418 A | 11/2003 |
| JP | 2002-123332 | 4/2002 |
| WO | 02/29529 | 4/2002 |
| WO | 2004/100411 | 11/2004 |

OTHER PUBLICATIONS

"Internet Time Synchronization: the Network Time Protocol", IEEE Transactions on Communications, vol. 39, No. 10, Oct. 1991, David L. Mills.*
David L. Mills "Network Time Protocol (Version 3) Specification, Implementation and Analysis", Network Working Group, Request for Comments: 1305, Obsoletes: RFC-1119, RFC-1059, RFC-958, University of Delaware, Mar. 1992, pp. 1-113.
Finnish Search Report dated Nov. 6, 2009, from corresponding Finnish application.
CN Search Report, dated May 3, 2013, in corresponding 2010-530531.

* cited by examiner

*Primary Examiner* — Mark Rinehart
*Assistant Examiner* — Peter Cheng
(74) *Attorney, Agent, or Firm* — Young & Thompson

(57) ABSTRACT

An arrangement for adjusting a clock signal in a network element of a communications network includes a processor device arranged to produce a control variable containing information about synchronization messages received from at least two other network elements. A situation in which the reception from a sending network element of synchronization messages of a good enough quality ceases will not significantly disturb the clock signal to be adjusted because only part of the control variable used for the adjustment depends on synchronization messages sent by an individual network element. In a preferred arrangement, the reference value of the control variable is changed in response to a situation where the reception from a sending network element of synchronization messages of a good enough quality ceases. Thus it is possible to reduce the change of the difference between the control variable and its reference value which further reduces disturbances caused in the clock signal to be adjusted.

23 Claims, 6 Drawing Sheets

METHOD AND ARRANGEMENT FOR ADJUSTMENT OF A CLOCK SIGNAL

FIELD OF THE INVENTION

The invention relates to a method and arrangement for the adjustment of a clock signal in a network element of a communications network, which network element is arranged to receive synchronisation messages from at least two other network elements connected to the communications network. The invention also relates to a network element of a communications network. The invention also relates to a computer program for adjusting a clock signal.

BACKGROUND OF THE INVENTION

In many communications networks there exists a need to synchronise the clock signals maintained in the network elements so that the frequencies and possibly also the phases of the clock signals in the network elements are locked to each other sufficiently well. In some communications networks there additionally exists a need to synchronise the time of day values maintained in the network elements so that the time of day values of the different network elements are identical as precisely as possible. In other words, the time of day values maintained in the different network elements should correspond to a common time to a best possible precision. Such a common time is generally called the universal wall clock time. The network elements mentioned above may be routers or base stations of a mobile network, for instance.

In a solution discussed in Mills, David L., "Network Time Protocol (Version 2) Specification and Implementation", IETF RFC-1119 (Internet Engineering Task Force, Request For Comments) the network elements send to other network elements synchronisation messages based on which each receiving network element adjusts the clock signal maintained by it. Each sending network element produces its synchronisation messages based on its clock signal. Each receiving network element usually receives synchronisation messages from more than one sending network element. A receiving network element is arranged to choose those of the received synchronisation messages that have been sent by a network element the clock signal of which is, according to certain predetermined criteria, of the best quality among the clock signals of the sending network elements. The receiving network element is arranged to adjust its clock signal on the basis of the synchronisation messages selected. In each network element which sends out synchronisation messages, the clock signal may belong e.g. to one of a plurality of predetermined quality categories, and each receiving network element may be arranged to select for the adjustment of the clock signal the synchronisation messages of the sending network element the clock signal of which belongs to the best available quality category.

A receiving network element may cease to receive synchronisation messages corresponding to a certain sending network element. Such a situation occurs e.g. when a sending network element becomes faulty or otherwise goes out of operation or the communications link between the sending network element and receiving network element becomes faulty or otherwise goes out of operation. If those synchronisation messages, which have been selected by the receiving network element for the clock signal adjustment, cease to arrive, the clock signal adjustment has to be continued based on synchronisation messages received from some other sending network element. Changing the clock signal adjustment so as to be based on synchronisation messages received from some other sending network element will often result in harmful oscillations in the frequency and/or phase of the clock signal adjusted.

SUMMARY OF THE INVENTION

The invention is directed to a novel arrangement for adjusting a clock signal in a first network element of a communications network, which first network element is arranged to receive synchronisation messages from at least two other network elements and includes an adjustable clock signal source to provide the clock signal. An arrangement according to the invention has a processor device arranged to:
 produce a control variable containing information about synchronisation messages received from the at least two other network elements, and
 adjust the clock signal based on an arithmetic difference between the control variable and reference value of the control variable.

The control variable mentioned above is advantageously e.g. a phase-indicator-weighted sum where each phase indicator is a quantity computed on the basis of synchronisation messages received from a certain sending network element, the temporal change in the quantity indicating the temporal change of the clock signal to be adjusted compared to the phase of the clock signal in the sending network element.

A situation in which the reception from a sending network element of good enough synchronisation messages ceases will not disturb the frequency and/or phase of the clock signal to be adjusted to such an extent as in the prior art solution described above, because in the arrangement according to the invention, only a part of the control variable used for the adjustment of the clock signal depends on synchronisation messages sent by an individual network element.

In an arrangement according to an advantageous embodiment of the invention the processor device is additionally arranged to:
 determine which portion of the reference value of the control variable corresponds to synchronisation messages received from each of the at least two other network elements, and
 in response to a situation where the first network element ceases to receive from one of the at least two other network elements synchronisation messages that meet a predetermined quality criterion, change the reference value of the control variable by an amount equalling a certain portion of the reference value of the control variable, which portion corresponds to the network element from which the first network element has ceased to receive synchronisation messages meeting the predetermined quality criterion.

An arrangement according to the embodiment described above makes it possible to reduce the change of the difference between the control variable and its reference value in a situation where the reception from a sending network element of synchronisation messages of a good enough quality ceases, thus further reducing disturbances produced in the frequency and/or phase of the clock signal to be adjusted.

The invention is also directed to a novel network element which includes a receiver for receiving synchronisation messages from at least two other network elements and an adjustable clock signal source for producing a clock signal. A network element according to the invention has a processor device arranged to:
 produce a control variable containing information about synchronisation messages received from the at least two other network elements, and adjust the clock signal based on an arithmetic difference between the control variable and a reference value of the control variable.

In a network element according to an advantageous embodiment of the invention the processor device is additionally arranged to:

- determine which portion of the reference value of the control variable corresponds to synchronisation messages received from each of the at least two other network elements, and
- in response to a situation where the reception from one of the at least two other network elements of synchronisation messages meeting a predetermined quality criterion ceases, change the reference value of the control variable by an amount equalling a certain portion of the reference value of the control variable, which portion corresponds to the network element from which the reception of synchronisation messages meeting the predetermined quality criterion has ceased.

The invention is also directed to a novel method for adjusting a clock signal in a first network element of a communications network, which first network element is arranged to receive synchronisation messages from at least two other network elements and includes an adjustable clock signal source to provide the clock signal. In a method according to the invention:

- a control variable is produced containing information about synchronisation messages received from the at least two other network elements, and
- the clock signal is adjusted based on an arithmetic difference between the control variable and reference value of the control variable.

Further, in a method according to an advantageous embodiment of the invention:

- it is determined which portion of the reference value of the control variable corresponds to synchronisation messages received from each of the at least two other network elements, and
- in response to a situation where the first network element ceases to receive from one of the at least two other network elements synchronisation messages meeting a predetermined quality criterion, the reference value of the control variable is changed by an amount equalling a certain portion of the reference value of the control variable, which portion corresponds to the network element from which the first network element has ceased to receive synchronisation messages meeting the predetermined quality criterion.

The invention is also directed to a computer program for adjusting a clock signal in a network element of a communications network, which network element is arranged to receive synchronisation messages from at least two other network elements and includes an adjustable clock signal source to provide the clock signal. A computer program according to the invention includes instructions readable by a programmable processor for making said programmable processor:

- produce a control variable containing information about synchronisation messages received from the at least two other network elements, and
- adjust the clock signal based on an arithmetic difference between the control variable and reference value of the control variable.

A computer program according to an advantageous embodiment of the invention also includes instructions readable by a programmable processor for making the programmable processor:

- determine which portion of the reference value of the control variable corresponds to synchronisation messages received from each of the at least two other network elements, and
- in response to a situation where the reception from one of the at least two other network elements of synchronisation messages meeting a predetermined quality criterion ceases, change the reference value of the control variable by an amount equalling a certain portion of the reference value of the control variable, which portion corresponds to the network element from which the reception of synchronisation messages meeting the predetermined quality criterion has ceased.

The computer program may be stored on a storage medium or coded into a signal which can be received from a communications network, for example. The storage medium may be a compact disc (CD) or random access memory (RAM) chip, for example.

The invention is further directed to a storage medium readable by a programmable processor, such as e.g. a CD or RAM chip containing the computer program according to the invention.

The various embodiments of the invention are characterised by that which is specified in the dependent claims.

BRIEF DESCRIPTION OF THE DRAWINGS

Embodiments of the invention and their advantages will now be described in closer detail with reference to the embodiments presented as examples and to the accompanying Figures where.

DETAILED DESCRIPTION OF EMBODIMENTS OF THE INVENTION

Figure 1:
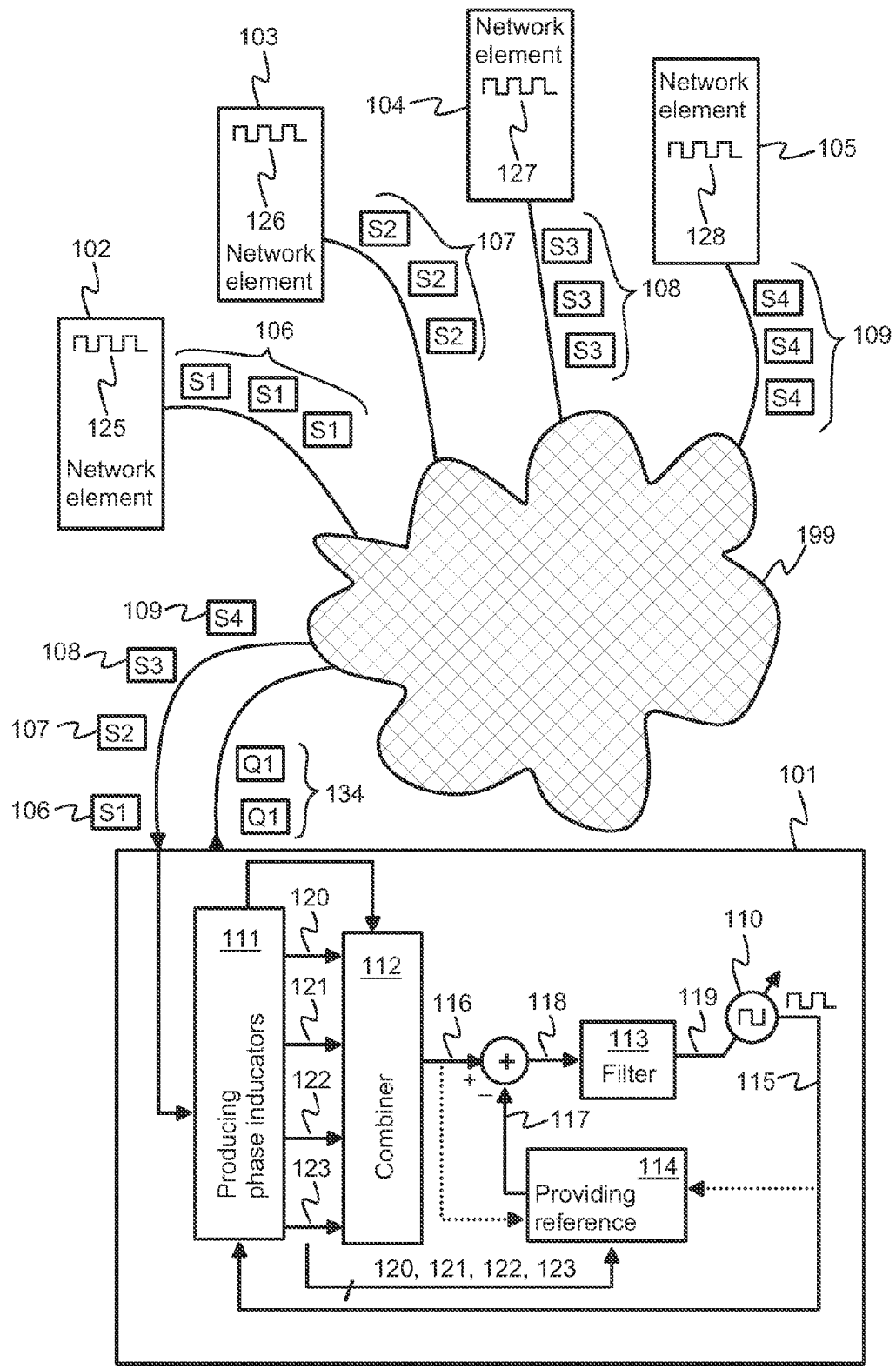
FIG. 1 shows in the form of a block diagram an example of a communications network comprising an arrangement according to an embodiment of the invention for adjusting a clock signal.

FIG. 1 shows in the form of block diagram an example of a communications network comprising an arrangement according to an embodiment of the invention for adjusting a clock signal. A communications network comprises a first network element 101 and second network elements 102, 103, 104, and 105. Other parts of the communications network are represented by the crosshatched area 199. Network element 101 is arranged to receive synchronisation messages from network elements 102, 103, 104, and 105 via the communications network 199. Synchronisation messages S1 sent by network element 102 are marked with reference number 106 in FIG. 1, synchronisation messages S2 sent by network element 103 are marked with reference number 107, synchronisation messages S3 sent by network element 104 are marked with reference number 108, and synchronisation messages S4 sent by network element 105 are marked with reference number 109. Each of the network elements 102 to 105 is arranged to send the synchronisation messages 106, 107, 108, or 109 timed by a clock signal 125, 126, 127, or 128 of the network element in question. The clock signals 125 to 128 may originate from a single source or from several different sources. Network element 101 has an adjustable clock signal source 110 arranged to produce an adjustable clock signal 115. The adjustable clock signal source may be a voltage controlled oscillator (VCO) or numerically controlled oscillator (NCO), for instance. The arrangement for adjusting the clock signal 115 comprises a processor device consisting of functional blocks 111 to 114, which processor device is adapted to produce a control variable 116 containing information about synchronisation messages 106 to 109 received from more than one network element 102 to 105. The processor device is further adapted to adjust the clock signal 115 on the basis of the difference 118 between the control variable 116 and its reference value 117. A situation in which a network element 101 stops receiving good enough synchronisation messages from a sending network element 102, 103, 104 or 105, will not unreasonably disturb the frequency and/or phase of the clock signal 115 to be adjusted, because only a certain portion of the control variable 116 used for the adjustment of the clock signal depends on synchronisation messages sent by an individual network element 102, 103, 104 or 105. The functional blocks 111 to 114 in the processor device can be implemented by software using one or more programmable processors, for example. The functional blocks may also be implemented using one or more application specific integrated circuits or a hybrid solution including one or more programmable processors, the software required, and one or more application specific integrated circuits.

Functional block 111 in the processor device is arranged to produce phase indicators 120 to 123. Temporal change of phase indicator 120 indicates the temporal change in the phase of the clock signal 115 to be adjusted compared to the phase of the clock signal 125 of network element 102, temporal change of phase indicator 121 indicates the temporal change in the phase of the clock signal 115 to be adjusted compared to the phase of the clock signal 126 of network element 103, temporal change of phase indicator 122 indicates the temporal change in the phase of the clock signal 115 to be adjusted compared to the phase of the clock signal 127 of network element 104, and temporal change of phase indicator 123 indicates the temporal change in the phase of the clock signal 115 to be adjusted compared to the phase of the clock signal 128 of network element 105.

Phase indicator 120, 121, 122 or 123 corresponding to a received synchronisation message may comprise the difference between the synchronisation message reception time and transmission time, for example. The reception time is indicated using the clock signal 115 to be adjusted and the transmission time is indicated using the clock signal 125, 126, 127 or 128 of the sending network element 102, 103, 104 or 105. The transmission time is transferred to the network element 101 advantageously as information, i.e. a time stamp, carried by the synchronisation message. Synchronisation messages may be e.g. messages carrying time stamps in accordance with the IEEE1588v2 (Institute of Electrical and Electronics Engineers) protocol. Other possible ways of producing phase indicators are presented later in this document.

Functional block 112 in the processor device is adapted to combine the information contained in the phase indicators 120 to 123 to produce a control variable 116. Thus the control variable 116 contains information about synchronisation messages 106 to 109 received from more than one network element 102 to 105. Functional block 113 in the processor device advantageously comprises a low-pass filter arranged to filter the difference 118 between the control variable 116 and its reference value 117 to produce a control signal 119. The control signal 119 is arranged to adjust the clock signal source 110. The reference value 117 is typically a constant value so that the frequency and possibly also phase of the clock signal 115 to be adjusted can be locked to the phases of clock signals 125 to 128. Functional block 114 in the processor device is arranged to store the reference value 117. The reference value 117 may be a predetermined constant value. It is also possible that the functional block 114 is arranged to calculate a mean or low-pass filtered value for the reference value 116 during the initialisation period and use the calculated mean or low-pass filtered value as the reference value 117 during normal operation.

In an arrangement according to an embodiment of the invention for adjusting a clock signal 115, the functional block 114 in the processor device is arranged to determine which portions of the reference value 117 of the control variable correspond to synchronisation messages received from each of the network elements 102 to 105. The functional block 114 is further arranged to change the reference value of the control variable by an amount corresponding to a certain portion of the reference value of the control variable, which portion corresponds to the network element 102, 103, 104 or 105 from which the reception of synchronisation messages meeting a predetermined quality criterion has ceased. An arrangement according to this embodiment makes it possible to reduce the change of the difference 118 between the control variable and its reference value in a situation where the reception from a sending network element 102, 103, 104 or 105 of synchronisation messages of a good enough quality ceases. Thus it is possible to reduce disturbances produced in the frequency and/or phase of the clock signal 115 to be adjusted. Reception of synchronisation messages meeting a predetermined quality criterion may cease in a situation in which a sending network element becomes inoperative or in a situation in which the link to a sending network element breaks or in a situation in which the quality of the link deteriorates e.g. due to re-routing to such an extent that the quality of the synchronisation messages is no longer good enough because of excessive variation in the transfer delay, for instance.

In an arrangement according to an embodiment of the invention the functional block 114 is further arranged to change the reference value of the control variable by an amount corresponding to a certain portion of the reference value of the control variable, which portion corresponds to the network element 102, 103, 104 or 105 from which the receiving network element has begun to receive synchronisation messages meeting a predetermined quality criterion. An arrangement according to this embodiment makes it possible to reduce the change of the difference 118 between the control variable and its reference value in a situation where the receiving network element begins to receive from a sending network element 102, 103, 104 or 105 synchronisation messages of a good enough quality. Thus it is possible to reduce disturbances produced in the frequency and/or phase of the clock signal 115 to be adjusted. Reception of synchronisation messages meeting a predetermined quality criterion may begin in a situation in which a sending network element becomes operative or in a situation in which the link to a sending network element is established or in a situation in which the quality of the link improves e.g. due to re-routing to such an extent that the quality of the synchronisation messages is good enough.

To illustrate, let us consider a situation, for example, in which synchronisation messages of a good enough quality are received from network elements 102, 103, and 104 and synchronisation messages which are of insufficient quality are received from network element 105. In an arrangement according to an embodiment of the invention the functional block 112 is arranged to produce a weighted sum of phase indicators 120 to 122 and to set the weighted sum as control variable 116. Then the control variable 116 can be expressed as:

$$s = w_1 p_1 + w_2 p_2 + w_3 p_3, \quad (1)$$

where s is the control variable 116, $p_1$, $p_2$, and $p_3$ are the phase indicators 120 to 122 and $w_1$, $w_2$, and $w_3$ are weight coefficients. The difference 118 between the control variable 116 and its reference value 117 is produced as follows:

$$e = w_1 p_1 + w_2 p_2 + w_3 p_3 - d, \quad (2)$$

where e is the difference between the control variable and its reference value and d is the reference value. Functional block 114 is arranged to produce temporal means $<p_1>$, $<p_2>$, and $<p_3>$ for the phase indicators 120 to 122. The temporal means may be produced using infinite impulse response (IIR) or finite impulse response (FIR) based low-pass filtering, for example. The control loop consisting of the processor device 111 to 114 and adjustable clock signal source 110 adjusts the frequency of the clock signal 115 so as to keep the difference e as constant as possible.

Let us assume, for example, that the reception from a network element 102, 103 or 104 of good enough synchronisation messages ceases, i.e. synchronisation messages are no longer received from the network element at all or the synchronisation messages received do not meet the predetermined quality criteria e.g. with regard to the variation of transfer delay. Without limiting generality, we can assume that good enough synchronisation messages are no longer received from network element 102. Term $w_1 p_1$ is thus removed from the equation (1). The removal of the term from the equation (1) results in a change in the gain of the control loop consisting of the processor device 111 to 114 and adjustable clock signal source 110. This change can be compensated for by multiplying the remaining weight coefficients $w_2$ and $w_3$ by a constant K which is expressed as $$K = (w_1 + w_2 + w_3)/(w_2 + w_3). \quad (3)$$

The change in the temporal mean of the control variable s is:

$$\Delta 1 = w'_2 <p_2> + w'_3 <p_3> - (w_1 <p_1> + w_2 <p_2> + w_3 <p_3>), \quad (4)$$

where $w'_2 = K w_2$ and $w'_3 = K w_3$. The effect of the change according to equation (4) can be compensated for by altering the reference value d of the control variable 116 as follows:

$$d_{new} = d + \Delta 1. \quad (5)$$

In other words, the reference value 117 of the control variable 116 is changed by a portion which corresponds to synchronisation messages received from network element 102, and advantageosly also the change caused in the gain of the adjustment of the clock signal 115 is compensated for.

To illustrate the operation of a system according to an embodiment of the invention, let us consider a second example situation in which synchronisation messages of a sufficient quality are being received from network elements 102, 103, and 104 and synchronisation messages which are of a sufficient quality are now beginning to be received from network element 105. A term $w_4 p_4$ is thus added in the equation (1), where $p_4$ is a phase indicator 123 and $w_4$ is the weight coefficient of that phase indicator. The change in the gain of the adjustment of the clock signal 115 can be compensated for by multiplying the weight coefficients $w_1$, $w_2$, $w_3$, and $w_4$ by a constant G which is expressed as $$G = (w_1 + w_2 + w_3)/(w_1 + w_2 + w_3 + w_4). \quad (6)$$

The change in the temporal mean of the control variable s is:

$$\Delta 2 = w''_1 <p_1> + w''_2 <p_2> + w''_3 <p_3> + w''_4 <p_4> - (w_1 <p_1> + w_2 <p_2> + w_3 <p_3>), \quad (7)$$

where $<p_4>$ is the temporal mean of the phase indicator 123, calculated using e.g. IIR or FIR based low-pass filtering, and $w''_1 = G w_1$, $w''_2 = G w_2$, $w''_3 = G w_3$ and $w''_4 = G w_4$. The effect of the change according to equation (7) can be compensated for by altering the reference value d of the control variable 116 as follows:

$$d_{new} = d + \Delta 2. \quad (8)$$

In an arrangement according to an embodiment of the invention the functional block 112 is arranged to produce a weighted sum of phase indicators 120 to 123 and to set the weighted sum as control variable 116. Functional block 111 is arranged to produce variation indicators which indicate temporal variation of the transfer delay of synchronisation messages received from each network element 102, 103, 104 or 105. These variation indicators may be e.g. variances of phase indicators 120 to 123 or other variables indicating temporal variation of phase indicators. Functional block 112 is arranged to adjust the weight coefficients of the weighted sum on the basis of the variation indicators such that phase indicators with less variation are given a larger weight coefficient than phase indicators with stronger variation. The weight coefficients of the weighted sum are thus adjusted on the basis of the transfer delay variation measured for the received synchronisation messages such that a smaller measured transfer delay variation corresponds to a larger weight coefficient than a larger measured transfer delay variation. Thus the portion of information represented by better-quality synchronisation messages is emphasised in the adjustment of the clock signal 115 compared with the portion of information represented by lower-quality synchronisation messages. The weight coefficients are advantageously adjusted continuously during normal operation.

In an arrangement according to an embodiment of the invention the processor device 111 to 114 is arranged to adjust the relative weight in the control variable 116 of information represented by synchronisation messages received from one or more of the network elements 102, 103, 104 or 105 on the basis of information received from the network element 102, 103, 104 or 105. The information may indicate e.g. the quality category of the clock signal 125, 126, 127 or 128 of the sending network element.

In an arrangement according to an embodiment of the invention network element 101 is arranged to send synchronisation messages to at least one of the sending network elements 102 to 105 and the processor device 111 to 114 is arranged to adjust the relative weight in the control variable 116 of information represented by synchronisation messages received from the at least one sending network element 102 to 105 on the basis of information received from the at least one sending network element. To illustrate, let us consider a situation, for example, in which network element 102 sends synchronisation messages 106 to network element 101, and network element 101 sends synchronisation messages 134 to network element 102. Sending of synchronisation messages 106 is timed by a clock signal 125, and sending of synchronisation messages 134 is timed by the clock signal 115 to be adjusted. A similar operation may take place between network element 101 and one or more of the network elements 103 to 105. Network element 101 adjusts the clock signal 115 at least partly on the basis of information represented by synchronisation messages 106. Using the synchronisation messages 134 and clock signal 125, network element 102 can produce an indicator indicating whether the frequency of the clock signal 115 should be decreased or increased. The indicator can be transferred from network element 102 to network element 101 e.g. as part of the information carried by synchronisation messages 106. In network element 101 a phase indicator 120 indicates whether the frequency of the clock signal 115 should be decreased or increased. Functional block 112 is arranged to give a weight to phase indicators 120, 121, 122, and/or 123 representing those sending network elements 102, 103, 104, and/or 105 which send information indicating that the clock signal 115 should be adjusted in the direction indicated by the phase indicator 120, 121, 122 or 123 corresponding to the sending network element, which weight is greater than that given to phase indicators 120, 121, 122, and/or 123 representing those sending network elements 102, 103, 104, and/or 105 which send information indicating that the clock signal 115 should be adjusted against the direction indicated by the phase indicator 120, 121, 122 or 123 corresponding to the sending network element. Thus in the adjustment of the clock signal 115, a greater weight is given to the information represented by synchronisation messages which can be assumed to be more reliable and have a better quality.

In an arrangement according to an embodiment of the invention the processor device 111 to 114 is arranged to:
select from among synchronisation messages received from each of the network elements 102, 103, 104 or 105 those that have transfer delays which belong to a predetermined portion of statistical distribution of the transfer delay, which portion includes the minimum value of the transfer delay, and
set the weight in the control variable 116 of information represented by the selected synchronisation messages larger than the weight in the control variable 116 of information represented by other synchronisation messages received from the network element 102, 103, 104 or 105.

In the above-described arrangement according to an embodiment of the invention, information represented by synchronisation messages that experienced a shorter transfer delay are given a larger weight than information represented by synchronisation messages that experienced a longer transfer delay. For the adjustment of the clock signal 115, the quality of the information represented by synchronisation messages which experienced a shorter transfer delay is better, because a shorter transfer delay has a smaller portion of random type delay caused by queueing of synchronisation messages in transmission and/or reception buffers of network elements in the communications network.

In an arrangement according to an embodiment of the invention the processor device 111 to 114 is arranged to produce temporal means for phase indicators 120 to 123, produce a weighted sum of the temporal means, and set the weighted sum as control variable 116. The temporal means may be produced using infinite impulse response (IIR) or finite impulse response (FIR) based low-pass filtering, for example.

In an arrangement according to an embodiment of the invention the processor device 111 to 114 is arranged to produce a weighted sum the weighted components of which are the temporal means of the phase indicators and those phase indicators that correspond to synchronisation messages the transfer delays of which belong to a predetermined portion of statistical distribution of the transfer delay, which portion includes the minimum value of the transfer delay. The processor device 111 to 114 is arranged to set the weighted sum as control variable 116. In an arrangement according to this embodiment of the invention, a portion representing disturbing random variation can be subtracted from the control variable 116.

In the example situation depicted in FIG. 1, there are at most four sending network elements and thus at most four phase indicators produced. An arrangement according to an embodiment of the invention for adjusting a clock signal may also be used in a situation involving more than four sending network elements.

Figure 2:
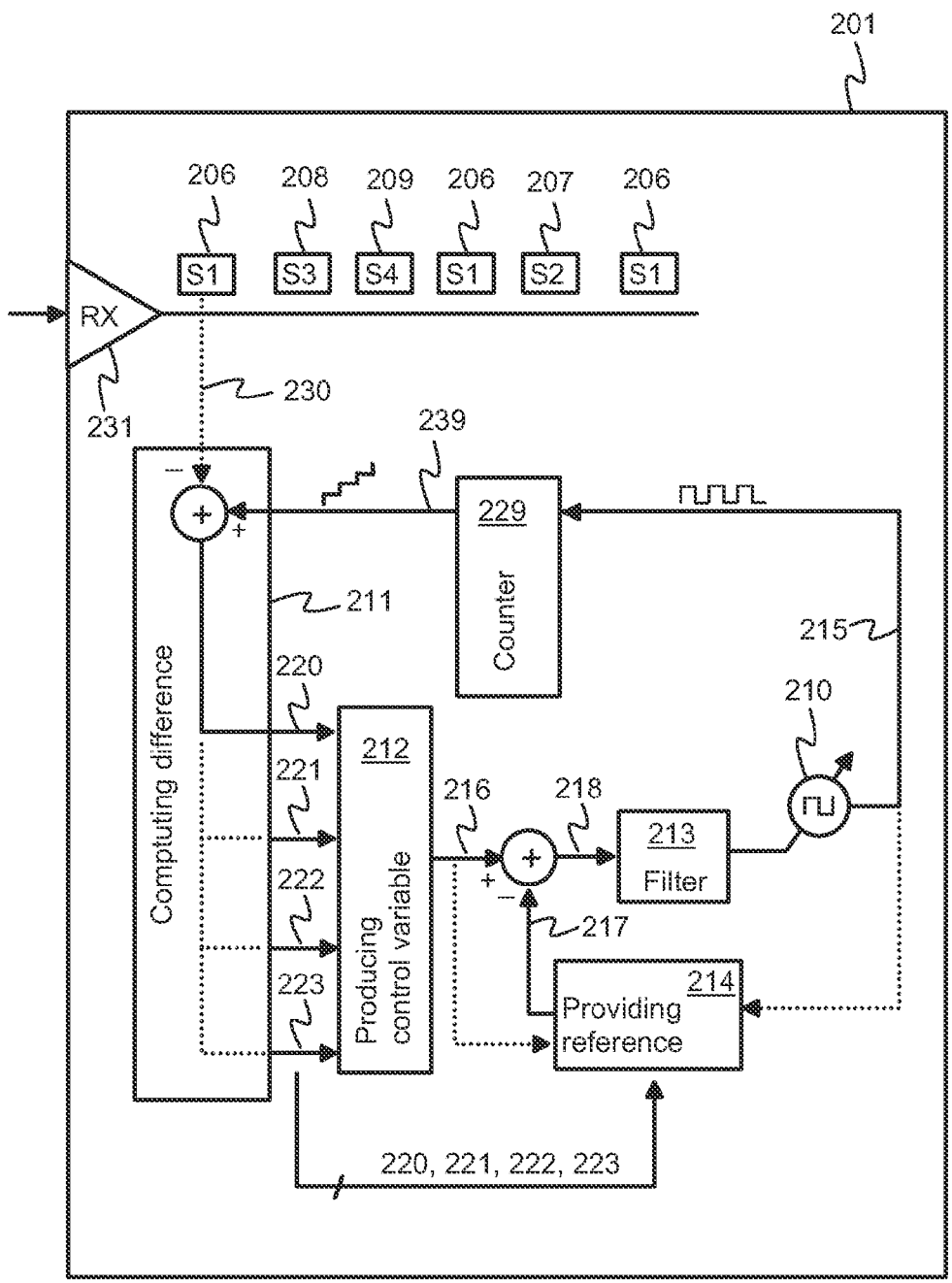
FIG. 2 shows a network element of a communications network comprising an arrangement according to an embodiment of the invention for adjusting a clock signal.

FIG. 2 shows a network element 201 of a communications network comprising an arrangement according to an embodiment of the invention for adjusting a clock signal 215. The network elements comprises a receiver 231 for receiving synchronisation messages 206 to 208 from at least two other network elements. The receiver comprises a means arranged to indicate for each received synchronisation message information that identifies the network element which sent the synchronisation message. The network element comprises an adjustable clock signal source 210 for producing a clock signal 215. The network element comprises a processor device comprised of functional blocks 211, 212, 213, 214, and 229 which is arranged to:
produce a control variable 216 containing information about synchronisation messages 206 to 208 received from the at least two other network elements, and
adjust the clock signal 215 based on the difference 218 between the control variable 216 and reference value 217 of the control variable.

In a network element according to an advantageous embodiment of the invention the processor device 211-214, 229 is additionally arranged to:
determine which portion of the reference value 214 of the control variable corresponds to synchronisation messages received from each of the at least two other network elements, and
in response to a situation where the reception from one of the at least two other network elements of synchronisation messages meeting a predetermined quality criterion ceases, change the reference value of the control variable by an amount equalling a portion of the reference value of the control variable, which portion corresponds to the network element from which the reception of synchronisation messages meeting the predetermined quality criterion has ceased.

The receiver 213 is arranged to read from a received synchronisation message a time stamp which corresponds to the sending moment of the synchronisation message. The time stamp read operation is represented by a dotted line 230 in FIG. 2. The processor device comprises a functional block 229 arranged to produce a time of day 239 using the clock signal 215. The functional block 229 may be a counter, for instance. Functional block 211 is arranged to produce the difference between the time of day 239, which corresponds to the reception moment of a synchronisation message, and time stamp read from the synchronisation message. This difference represents the phase indicator 220, 221, 222 or 223 which is used in producing the control variable 216.

Figure 3:
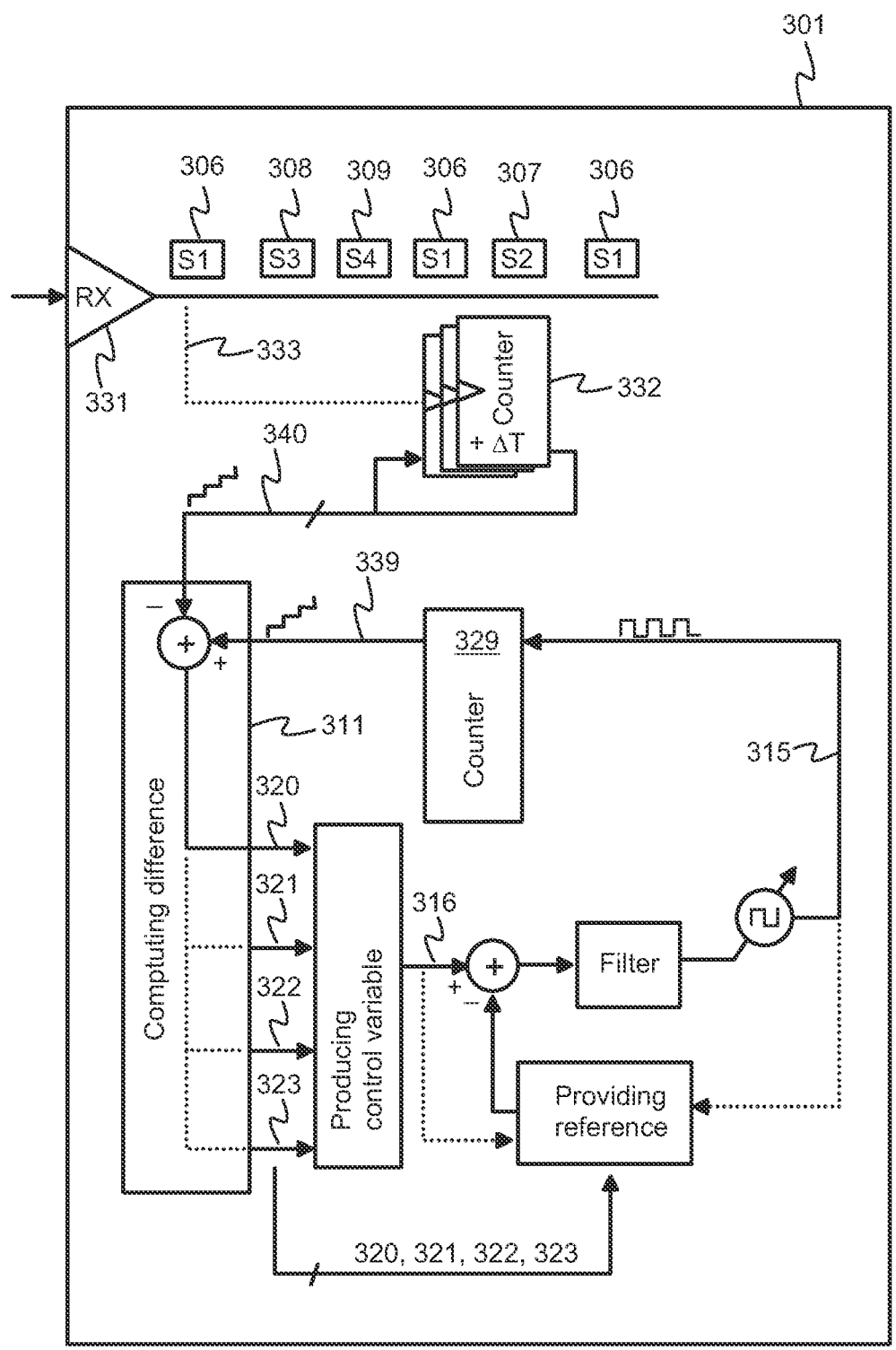
FIG. 3 shows a network element of a communications network comprising an arrangement according to an embodiment of the invention for adjusting a clock signal.

FIG. 3 shows a network element 301 of a communications network comprising an arrangement according to an embodiment of the invention for adjusting a clock signal 315. The arrangement is similar to that in the network element depicted in FIG. 2 except for producing the phase indicators 320, 321, 322, and 323. An arrangement according to this embodiment of the invention comprises a functional block 332 arranged to produce estimates for the sending moments of received synchronisation messages 306 to 309. The functional block 332 may be e.g. a device consisting of a plurality of parallel counters with a counter for each sending network element. Output 340 of each counter is increased by a predetermined increment in response to a situation where a synchronisation message is received from a sending network element which corresponds to the counter in question. Adjustment of the clock signal 315 is based on the assumption that each sending network element sends synchronisation messages at regular intervals and that the relationships between the sending intervals of the sending network elements are known. The increment value of each counter indicates how many cycles of the clock signal 315 there should be in the time interval between successive synchronisation messages of the sending network element. In FIG. 3 the dotted line 333 represents triggering of the counter 332 in response to a reception of a synchronisation message corresponding to the counter. Functional block 329 is arranged to produce the time of day 339 using the clock signal 315. Functional block 311 is arranged to produce the difference between the time of day 339 corresponding to the reception moment of a synchronisation message, and output value 340 of the counter corresponding to the synchronisation message. This difference represents the phase indicator 320, 321, 322 or 323 which is used in producing the control variable 316.

Figure 4:
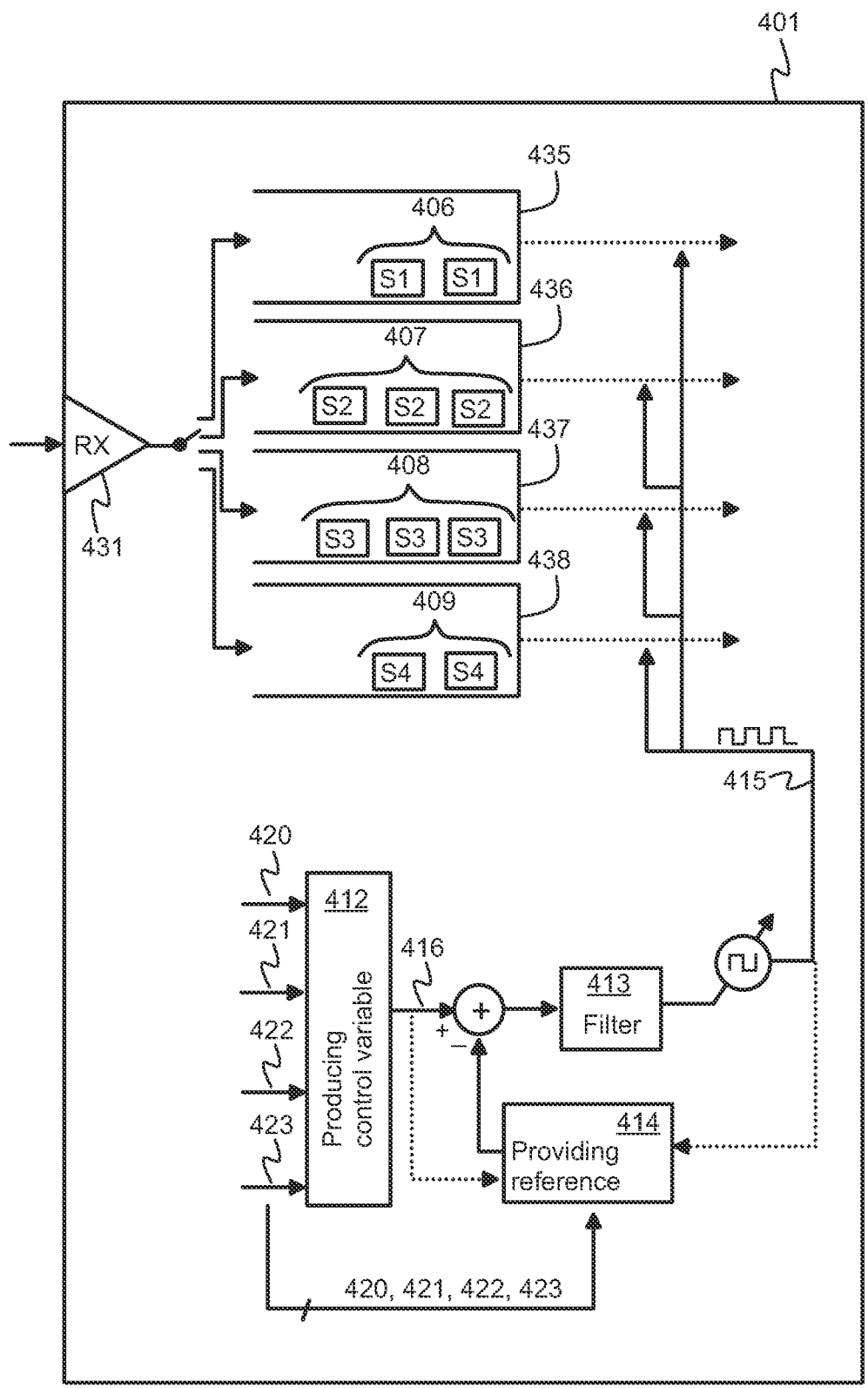
FIG. 4 shows a network element of a communications network comprising an arrangement according to an embodiment of the invention for adjusting a clock signal.

FIG. 4 shows a network element 401 of a communications network with buffer memories 435, 436, 437, and 438 for buffering received synchronisation messages 406, 407, 408, and 409 such that synchronisation messages received from different network elements are placed in buffer memories which are separate at least logically. The buffer memories can be implemented using one or more random access memory (RAM) circuits, for example. Clock signal 415 provides the timing for the reading of each buffer memory. Each buffer memory thus tends to become more full if the frequency of the clock signal 415 is smaller than a value corresponding to the rate of arrival of data to be buffered in the buffer memory. Conversely, each buffer memory tends to become less full if the frequency of the clock signal 415 is greater than a value corresponding to the rate of arrival of data to be buffered in the buffer memory. The network element comprises an arrangement according to an embodiment of the invention for adjusting the clock signal 415. The arrangement comprises a processor device consisting of functional blocks 412, 413, and 414, which processor device is arranged to adjust the clock signal on the basis of the situation in the buffer memories 435, 436, 437, and 438. In an arrangement according to an embodiment of the invention the processor device 412 to 414 is arranged to produce a weighted sum of the buffer times experienced by the received synchronisation messages 406 to 409 and set the weighted sum as control variable 416. Then the phase indicators 420, 421, 422, and 423 in FIG. 4 represent the buffer times experienced by the synchronisation messages. The buffer time experienced by each synchronisation message indicates the filling degree of the buffer memory at the moment of arrival of the synchronisation message.

In an arrangement according to an embodiment of the invention the processor device 412 to 414 is arranged to produce a weighted sum of the filling degrees of the buffer memories 435 to 438 reserved for the received synchronisation messages 406 to 409 and set the weighted sum as the control variable 416. Then the phase indicators 420, 421, 422, and 423 in FIG. 4 represent the filling degrees of the buffer memories 435 to 438.

Each of the network elements 201, 301, and 410 in FIGS. 2, 3, and 4 may be an Internet Protocol (IP) router, Ethernet switch, base station of a mobile network, a multiprotocol label switching (MPLS) device or a combination of any of the above.

Figure 5:
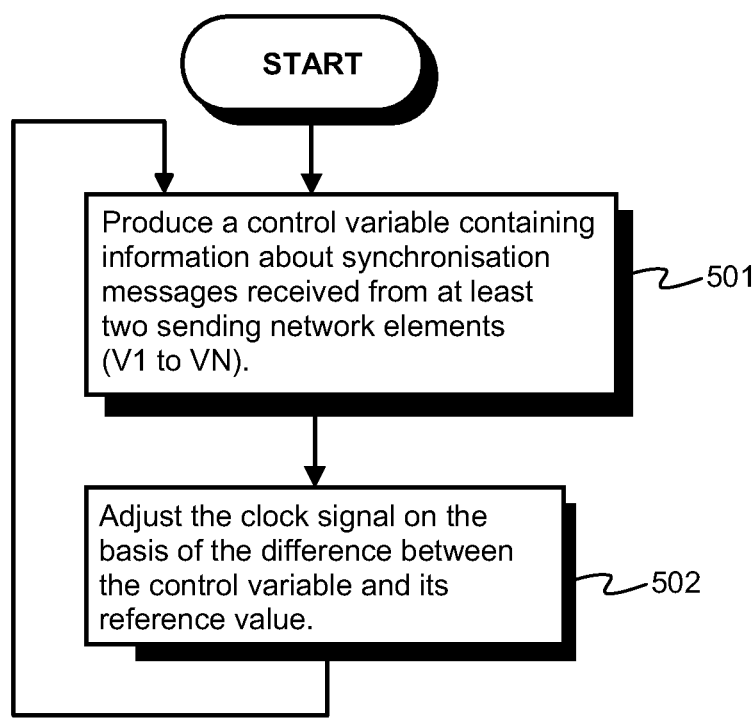
FIG. 5 shows in the form of flow diagram a method according to an embodiment of the invention for adjusting a clock signal.

FIG. 5 shows in the form of flow diagram a method for adjusting a clock signal in a first network element of a communications network, which first network element is arranged to receive synchronisation messages from at least two other network elements V1 to VN and includes an adjustable clock signal source to provide the clock signal. In the method:
 a control variable is produced in step 501 containing information about synchronisation messages received from the at least two other network elements, and
 the clock signal is adjusted in step 502 based on the difference between the control variable and reference value of the control variable.

Figure 6:
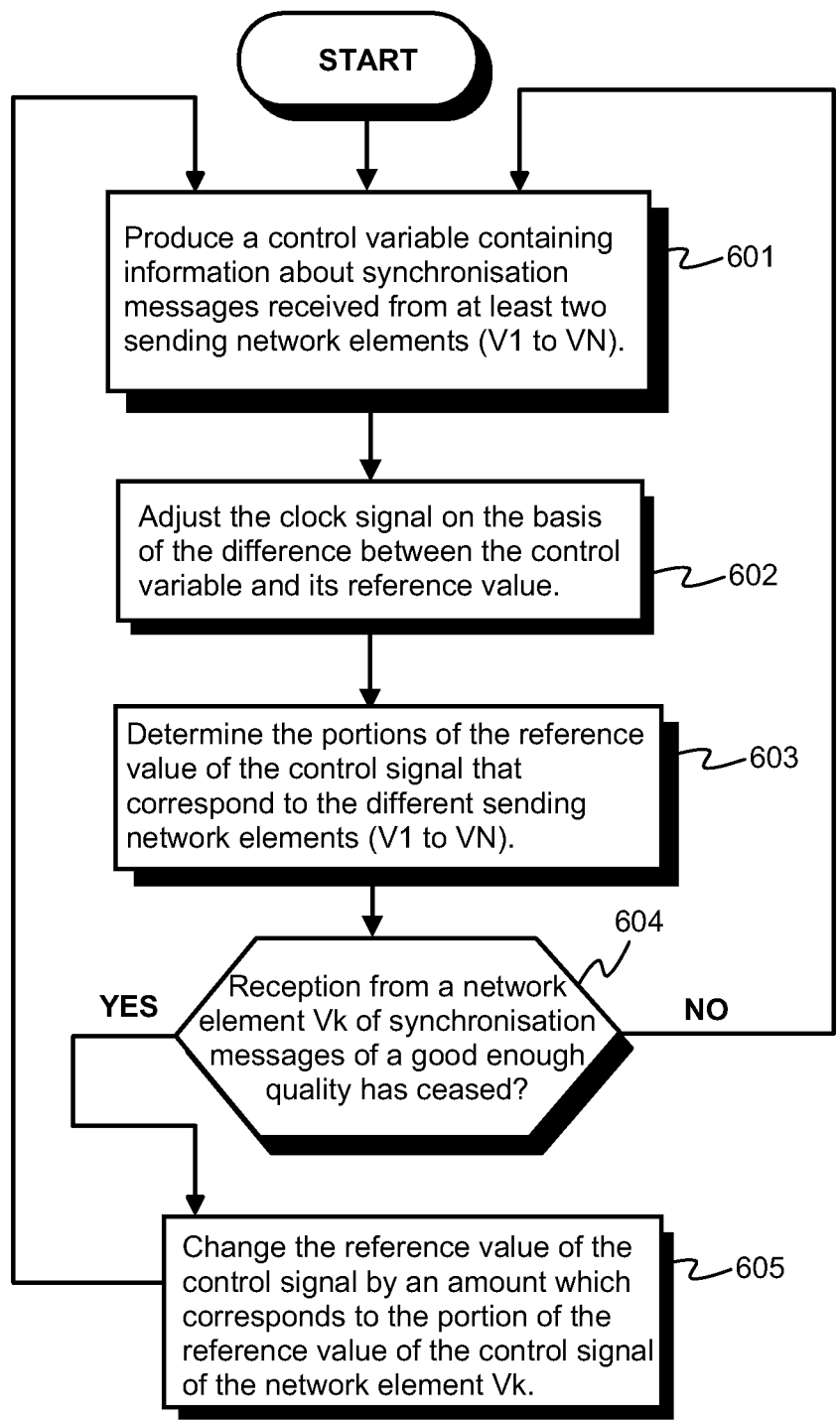
FIG. 6 shows in the form of flow diagram a method according to an embodiment of the invention for adjusting a clock signal.

FIG. 6 shows in the form of flow diagram a method for adjusting a clock signal in a first network element of a communications network, which first network element is arranged to receive synchronisation messages from at least two other network elements V1 to VN and includes an adjustable clock signal source to provide the clock signal. In the method:
 a control variable is produced in step 601 containing information about synchronisation messages received from the at least two other network elements, and
 the clock signal is adjusted in step 602 based on the difference between the control variable and reference value of the control variable,
 it is determined in step 603 which portion of the reference value of the control variable corresponds to the synchronisation messages received from each of the at least two other network elements, and
 in response to a situation, step 604, where the first network element ceases to receive from one of the at least two other network elements synchronisation messages meeting a predetermined quality criterion, the reference value of the control variable is changed in step 605 by an amount equalling a portion of the reference value of the control variable, which portion corresponds to the network element from which the first network element has ceased to receive synchronisation messages meeting the predetermined quality criterion.

In a method according to an embodiment of the invention there is produced a weighted sum of phase indicators calculated on the basis of synchronisation messages received from the at least two other network elements, and the weighted sum is set as the control variable, the temporal change of each phase indicator indicating the temporal change of the phase of the clock signal compared to the phase of the clock signal in a second network element which is one of the at least two network elements.

In a method according to an embodiment of the invention there is produced a weighted sum of buffer times of synchronisation messages received from the at least two other network elements, and the weighted sum is set as the control variable, where synchronisation messages received from different network elements are located in logically separate buffer memories and the buffer time of each synchronisation message corresponds to the delay time of the synchronisation message in the buffer memory used for the synchronisation message.

In a method according to an embodiment of the invention there is produced a weighted sum of the filling degrees of buffer memories reserved for the synchronisation messages received from the at least two other network elements, and the weighted sum is set as the control variable, where synchronisation messages received from different network elements are located in logically separate buffer memories.

In a method according to an embodiment of the invention each weight coefficient of the weighted sum is set on the basis of transfer delay variation measured for synchronisation messages received from a second network element, which is one of the at least two other network elements and corresponds to the weight coefficient in question, where a smaller measured transfer delay variation corresponds to a larger weight coefficient than a greater measured transfer delay variation.

In a method according to an embodiment of the invention the relative weight in the control variable of the information represented by synchronisation messages received from a second network element, which is one of the at least two other network elements, is adjusted on the basis of information received from the second network element.

In a method according to an embodiment of the invention:
among synchronisation messages received from a second network element, which is one of the at least two other network elements, it is selected those that have transfer delays which belong to a predetermined portion of statistical distribution of the transfer delay, which portion includes the minimum value of the transfer delay, and
the weight in the control variable of information represented by the selected synchronisation messages is set greater than the weight in the control variable of information represented by other synchronisation messages received from the second network element.

In a method according to an embodiment of the invention there is produced a temporal mean of phase indicators formed on the basis of synchronisation messages received from the second network element, and the temporal mean of the phase indicators is set as a component in the control variable, the variation in the values of the phase indicators indicating the temporal change of the phase of the clock signal compared to the phase of the clock signal in the second network element.

In a method according to an embodiment of the invention the phase indicator corresponding to each received synchronisation message is one of the following:
difference between the value of the clock signal at the moment of reception of the synchronisation message and the time of day or its estimate of the transmission moment of the synchronisation message,
delay time of the synchronisation message in the buffer memory of the first network element, or
filling degree of the buffer memory storing the synchronisation message in the first network element.

In a method according to an embodiment of the invention the synchronisation messages are messages carrying time stamps in accordance with the IEEE1588v2 (Institute of Electrical and Electronics Engineers) protocol.

A computer program according to an embodiment of the invention comprises a software means for adjusting a clock signal in a network element of a communications network, which network element is arranged to receive synchronisation messages from at least two other network elements and includes an adjustable clock signal source to provide the clock signal. Said software means comprises instructions readable by a programmable processor for making said programmable processor:

produce a control variable containing information about synchronisation messages received from the at least two other network elements, and
adjust the clock signal on the basis of the difference between the control variable and a reference value of the control variable.

In a computer program according to an embodiment of the invention the software means also includes instructions readable by a programmable processor for making said programmable processor:
determine which portion of the reference value of the control variable corresponds to synchronisation messages received from each of the at least two other network elements, and
in response to a situation where the reception from one of the at least two other network elements of synchronisation messages meeting a predetermined quality criterion ceases, change the reference value of the control variable by an amount equalling a portion of the reference value of the control variable, which portion corresponds to the network element from which the reception of synchronisation messages meeting the predetermined quality criterion has ceased.

A computer program according to an embodiment of the invention is stored on a storage medium, such as an optical compact disk (CD), readable by the programmable processor.

A computer program according to an embodiment of the invention is coded into a signal which can be received from a communications network such as the Internet, for example.

A computer program according to an embodiment of the invention is coded on a memory medium according to an embodiment of the invention, such as e.g. a CD or RAM chip, readable by a programmable processor.

Some embodiments of the present invention are described below with the aid of the following numbered clauses 1-27:

Clause 1. An arrangement for adjusting a clock signal of a first network element of a communications network, the first network element being arranged to receive synchronisation messages from at least two other network elements and comprising an adjustable clock signal source to produce the clock signal, the arrangement comprising a processor device arranged to:
produce a control variable containing information about synchronisation messages received from the at least two other network elements, and
adjust the clock signal based on a difference between the control variable and a reference value of the control variable.

Clause 2. An arrangement according to Clause 1, wherein the processor device is further arranged to:
determine which portion of the reference value of the control variable corresponds to synchronisation messages received from each of the at least two other network elements, and
in response to a situation where the first network element ceases to receive from one of the at least two other network elements synchronisation messages meeting a predetermined quality criterion, change the reference value of the control variable by an amount equalling a portion of the reference value of the control variable, which portion corresponds to the network element from which the first network element has ceased to receive synchronisation messages meeting the predetermined quality criterion.

Clause 3. An arrangement according to Clause 1 or 2, wherein the proessor device is arranged to produce a weighted sum of phase indicators calculated on the basis of synchronisation messages received from the at least two other network elements and to set the weighted sum as the control variable, the temporal change of each phase indicator indicating the temporal change of the phase of the clock signal compared to the phase of the clock signal in a second network element which is one of the at least two other network elements.

Clause 4. An arrangement according to Clause 1 or 2, wherein the processor device is arranged to produce a weighted sum of buffer times of synchronisation messages received from the at least two other network elements and to set the weighted sum as the control variable, where synchronisation messages received from different network elements are located in logically separate buffer memories and the buffer time of each synchronisation message corresponds to the delay time of the synchronisation message in the buffer memory used for the synchronisation message.

Clause 5. An arrangement according to Clause 1 or 2, wherein the processor device is arranged to produce a weighted sum of filling degrees of buffer memories reserved for synchronisation messages received from the at least two other network elements and to set the weighted sum as the control variable, where synchronisation messages received from different network elements are located in logically separate buffer memories.

Clause 6. An arrangement according to any one of Clauses 3 to 5, wherein the processor device is arranged to adjust the weight coefficient of the weighted sum on the basis of transfer delay variation measured for synchronisation messages received from a second network element, which is one of the at least two other network elements and corresponds to the weight coefficient in question, where a smaller measured transfer delay variation corresponds to a larger weight coefficient than that of a greater measured transfer delay variation.

Clause 7. An arrangement according to Clause 1 or 2, wherein the processor device is arranged to adjust the relative weight in the control variable of the information represented by synchronisation messages received from a second network element, which is one of the at least two other network elements, on the basis of information received from the second network element.

Clause 8. An arrangement according to Clause 1 or 2, wherein the processor device is arranged to:
 select from among synchronisation messages received from a second network element, which is one of the at least two other network elements, those that have transfer delays which belong to a predetermined portion of statistical distribution of the transfer delay, which portion includes the minimum value of the transfer delay, and
 set the weight in the control variable of information represented by the selected synchronisation messages greater than the weight in the control variable of information represented by other synchronisation messages received from the second network element.

Clause 9. An arrangement according to Clause 8, wherein the processor device is arranged to produce a temporal mean of phase indicators formed on the basis of synchronisation messages received from the second network element and to set the temporal mean of the phase indicators as a component in the control variable, the variation in the values of the phase indicators indicating the temporal change of the phase of the clock signal compared to the phase of the clock signal in the second network element.

Clause 10. An arrangement according to Clause 9, wherein a phase indicator corresponding to each received synchronisation message is one of the following:
 difference between the value of the clock signal at the moment of reception of the synchronisation message and the time of day or its estimate of the transmission moment of the synchronisation message,
 delay time of the synchronisation message in the buffer memory of the first network element, or
 filling degree of the buffer memory storing the synchronisation message in the first network element.

Clause 11. An arrangement according to Clause 1 or 2, characterised in that the synchronisation messages are messages carrying time stamps in accordance with the IEEE1588v2 (Institute of Electrical and Electronics Engineers) protocol.

Clause 12. A network element comprising a receiver for receiving synchronisation messages from at least two other network elements, an adjustable clock signal source for producing a clock signal, and a processor device arranged to:
 produce a control variable containing information about synchronisation messages received from the at least two other network elements, and
 adjust the clock signal based on a difference between the control variable and a reference value of the control variable.

Clause 13. A network element according to Clause 12, wherein the processor device is further arranged to:
 determine which portion of the reference value of the control variable corresponds to synchronisation messages received from each of the at least two other network elements, and
 in response to a situation where the first network element ceases to receive from one of the at least two other network elements synchronisation messages meeting a predetermined quality criterion, change the reference value of the control variable by an amount equalling a portion of the reference value of the control variable, which portion corresponds to the network element from which the first network element has ceased to receive synchronisation messages meeting the predetermined quality criterion.

Clause 14. A network element according to Clause 12, characterised in that the network element is one or more of the following: an IP (Internet Protocol) router, an Ethernet switch, a base station of mobile network, and a multiprotocol label switching (MPLS) device.

Clause 15. A method for adjusting a clock signal of a first network element of a communications network, the first network element being arranged to receive synchronisation messages from at least two other network elements and comprising an adjustable clock signal source to provide the clock signal, the method comprising:
 producing a control variable containing information about synchronisation messages received from the at least two other network elements, and
 adjusting the clock signal on the basis of the difference between the control variable and a reference value of the control variable.

Clause 16. A method according to Clause 15, wherein the method comprises:
 determining which portion of the reference value of the control variable corresponds to the synchronisation messages received from each of the at least two other network elements, and in response to a situation where the first network element ceases to receive from one of the at least two other network elements synchronisation messages that meet a predetermined quality criterion, changing the reference value of the control variable by an amount equalling a portion of the reference value of the control variable, which portion corresponds to the network element from which the first network element has ceased to receive synchronisation messages that meet the predetermined quality criterion.

Clause 17. A method according to Clause 15 or 16, wherein the method comprises producing a weighted sum of phase indicators calculated on the basis of synchronisation messages received from the at least two other network elements, and to set the weighted sum as the control variable, the temporal change of each phase indicator indicating the temporal change of the phase of the clock signal compared to the phase of the clock signal in a second network element which is one of the at least two network elements.

Clause 18. A method according to Clause 15 or 16, wherein the method comprises producing a weighted sum of buffer times of synchronisation messages received from the at least two other network elements, and to set the weighted sum as the control variable, where synchronisation messages received from different network elements are located in logically separate buffer memories and the buffer time of each synchronisation message corresponds to the delay time of the synchronisation message in the buffer memory used for the synchronisation message.

Clause 19. A method according to Clause 15 or 16, wherein the method comprises producing a weighted sum of the filling degrees of buffer memories reserved for the synchronisation messages received from the at least two other network elements, and to set the weighted sum as the control variable, where synchronisation messages received from different network elements are located in logically separate buffer memories.

Clause 20. A method according to any of Clauses 17-19, wherein the method comprises adjusting the weight coefficient of the weighted sum on the basis of transfer delay variation measured for synchronisation messages received from a second network element, which is one of the at least two other network elements and corresponds to the weight coefficient in question, a smaller measured transfer delay variation corresponding to a larger weight coefficient than a greater measured transfer delay variation.

Clause 21. A method according to Clause 15 or 16, wherein the method comprises adjusting the relative weight in the control variable of the information represented by synchronisation messages received from a second network element, which is one of the at least two other network elements, on the basis of information received from the second network element.

Clause 22. A method according to Clause 15 or 16, wherein the method comprises:
selecting from among synchronisation messages received from a second network element, which is one of the at least two other network elements, those that have transfer delays which belong to a predetermined portion of statistical distribution of the transfer delay, which portion includes the minimum value of the transfer delay, and
setting the weight in the control variable of information represented by the selected synchronisation messages greater than the weight in the control variable of information represented by other synchronisation messages received from the second network element.

Clause 23. A method according to Clause 22, wherein the method comprises producing a temporal mean of phase indicators formed on the basis of synchronisation messages received from the second network element, and to set the temporal mean of the phase indicators as a component in the control variable, the variation in the values of the phase indicators indicating the temporal change of the phase of the clock signal compared to the phase of the clock signal in the second network element.

Clause 24. A method according to Clause 23, wherein the phase indicator corresponding to each received synchronisation message is one of the following:
difference between the value of the clock signal at the moment of reception of the synchronisation message and the time of day or its estimate of the transmission moment of the synchronisation message,
delay time of the synchronisation message in the buffer memory of the first network element, or
filling degree of the buffer memory storing the synchronisation message in the first network element.

Clause 25. A method according to Clause 15 or 16, wherein the synchronisation messages are messages carrying time stamps in accordance with the IEEE1588v2 (Institute of Electrical and Electronics Engineers) protocol.

Clause 26. A computer readable medium encoded with a computer program for adjusting a clock signal in a network element of a communications network, the network element being arranged to receive synchronisation messages from at least two other network elements and comprising an adjustable clock signal source to provide the clock signal, the computer program comprising instructions readable by a programmable processor for making the programmable processor:
produce a control variable containing information about synchronisation messages received from the at least two other network elements,
adjust the clock signal based on the difference between the control variable and a reference value of the control variable.

Clause 27. A computer readable medium according to Clause 26, wherein the computer program comprising instructions readable by a programmable processor for making the programmable processor:
determine which portion of the reference value of the control variable corresponds to synchronisation messages received from each of the at least two other network elements, and
in response to a situation where the reception from one of the at least two other network elements of synchronisation messages meeting a predetermined quality criterion ceases, change the reference value of the control variable by an amount equalling a portion of the reference value of the control variable, which portion corresponds to the network element from which the reception of synchronisation messages meeting the predetermined quality criterion has ceased.

As is obvious to a person skilled in the art, the invention and its embodiments are not limited to the illustrative embodiments described above. Expressions used in the claims describing the existence of characteristic features, such as "the arrangement comprises a processor device" are non-exclusive such that a mention of a characteristic feature shall not exclude the existence of other characteristic features not mentioned in the independent or dependent claims.

The invention claimed is:

1. An arrangement for adjusting a clock signal of a first network element of a communications network, the first network element being arranged to receive synchronisation messages from at least two other network elements and comprising an adjustable clock signal source to produce the clock signal, the arrangement comprising a processor device arranged to:

produce a control variable containing information about synchronisation messages received from the at least two other network elements, adjust the clock signal based on an arithmetic difference between the control variable and a reference value of the control variable, determine which portion of the reference value of the control variable corresponds to synchronisation messages received from each of the at least two other network elements, and in response to a situation where the first network element ceases to receive from one of the at least two other network elements synchronisation messages meeting a predetermined quality criterion, change the reference value of the control variable by an amount equalling a portion of the reference value of the control variable, which portion corresponds to the network element from which the first network element has ceased to receive synchronisation messages meeting the predetermined quality criterion.

2. An arrangement according to claim 1, wherein the processor device is arranged to produce a weighted sum of phase indicators calculated on the basis of synchronisation messages received from the at least two other network elements and to set the weighted sum as the control variable, the temporal change of each phase indicator indicating the temporal change of the phase of the clock signal compared to the phase of the clock signal in a second network element which is one of the at least two other network elements.

3. An arrangement according to claim 2, wherein the processor device is arranged to adjust the weight coefficient of the weighted sum on the basis of transfer delay variation measured for synchronisation messages received from a second network element, which is one of the at least two other network elements and corresponds to the weight coefficient in question, where a smaller measured transfer delay variation corresponds to a larger weight coefficient than that of a greater measured transfer delay variation.

4. An arrangement according to claim 1, wherein the processor device is arranged to produce a weighted sum of buffer times of synchronisation messages received from the at least two other network elements and to set the weighted sum as the control variable, where synchronisation messages received from different network elements are located in logically separate buffer memories and the buffer time of each synchronisation message corresponds to the delay time of the synchronisation message in the buffer memory used for the synchronisation message.

5. An arrangement according to claim 1, wherein the processor device is arranged to produce a weighted sum of filling degrees of buffer memories reserved for synchronisation messages received from the at least two other network elements and to set the weighted sum as the control variable, where synchronisation messages received from different network elements are located in logically separate buffer memories.

6. An arrangement according to claim 1, wherein the processor device is arranged to adjust the relative weight in the control variable of the information represented by synchronisation messages received from a second network element, which is one of the at least two other network elements, on the basis of information received from the second network element.

7. An arrangement according to claim 1, wherein the processor device is arranged to:

select from among synchronisation messages received from a second network element, which is one of the at least two other network elements, those that have transfer delays which belong to a predetermined portion of statistical distribution of the transfer delay, which portion includes the minimum value of the transfer delay, and set the weight in the control variable of information represented by the selected synchronisation messages greater than the weight in the control variable of information represented by other synchronisation messages received from the second network element.

8. An arrangement according to claim 7, wherein the processor device is arranged to produce a temporal mean of phase indicators formed on the basis of synchronisation messages received from the second network element and to set the temporal mean of the phase indicators as a component in the control variable, the variation in the values of the phase indicators indicating the temporal change of the phase of the clock signal compared to the phase of the clock signal in the second network element.

9. An arrangement according to claim 8, wherein a phase indicator corresponding to each received synchronisation message is one of the following:

difference between the value of the clock signal at the moment of reception of the synchronisation message and the time of day or its estimate of the transmission moment of the synchronisation message, delay time of the synchronisation message in the buffer memory of the first network element, or filling degree of the buffer memory storing the synchronisation message in the first network element.

10. An arrangement according to claim 1, wherein the synchronisation messages are messages carrying time stamps in accordance with the IEEE1588v2 (Institute of Electrical and Electronics Engineers) protocol.

11. A network element comprising a receiver for receiving synchronisation messages from at least two other network elements, an adjustable clock signal source for producing a clock signal, and a processor device arranged to:

produce a control variable containing information about synchronisation messages received from the at least two other network elements, adjust the clock signal based on an arithmetic difference between the control variable and a reference value of the control variable, determine which portion of the reference value of the control variable corresponds to synchronisation messages received from each of the at least two other network elements, and in response to a situation where the first network element ceases to receive from one of the at least two other network elements synchronisation messages meeting a predetermined quality criterion, change the reference value of the control variable by an amount equalling a portion of the reference value of the control variable, which portion corresponds to the network element from which the first network element has ceased to receive synchronisation messages meeting the predetermined quality criterion.

12. A network element according to claim 11, wherein the network element is one or more of the following: an IP (Internet Protocol) router, an Ethernet switch, a base station of mobile network, and a multiprotocol label switching (MPLS) device.

13. A method for adjusting a clock signal of a first network element of a communications network, the first network element being arranged to receive synchronisation messages from at least two other network elements and comprising an adjustable clock signal source to provide the clock signal, the method comprising:

producing a control variable containing information about synchronisation messages received from the at least two other network elements, adjusting the clock signal on the basis of an arithmetic difference between the control variable and a reference value of the control variable, determining which portion of the reference value of the control variable corresponds to the synchronisation messages received from each of the at least two other network elements, and in response to a situation where the first network element ceases to receive from one of the at least two other network elements synchronisation messages that meet a predetermined quality criterion, changing the reference value of the control variable by an amount equalling a portion of the reference value of the control variable, which portion corresponds to the network element from which the first network element has ceased to receive synchronisation messages that meet the predetermined quality criterion.

14. A method according to claim 13, wherein the method comprises producing a weighted sum of phase indicators calculated on the basis of synchronisation messages received from the at least two other network elements, and to set the weighted sum as the control variable, the temporal change of each phase indicator indicating the temporal change of the phase of the clock signal compared to the phase of the clock signal in a second network element which is one of the at least two network elements.

15. A method according to claim 14, wherein the method comprises adjusting the weight coefficient of the weighted sum on the basis of transfer delay variation measured for synchronisation messages received from a second network element, which is one of the at least two other network elements and corresponds to the weight coefficient in question, a smaller measured transfer delay variation corresponding to a larger weight coefficient than a greater measured transfer delay variation.

16. A method according to claim 14, wherein the synchronisation messages are messages carrying time stamps in accordance with the IEEE1588v2 (Institute of Electrical and Electronics Engineers) protocol.

17. A method according to claim 13, wherein the method comprises producing a weighted sum of buffer times of synchronisation messages received from the at least two other network elements, and to set the weighted sum as the control variable, where synchronisation messages received from different network elements are located in logically separate buffer memories and the buffer time of each synchronisation message corresponds to the delay time of the synchronisation message in the buffer memory used for the synchronisation message.

18. A method according to claim 13, wherein the method comprises producing a weighted sum of the filling degrees of buffer memories reserved for the synchronisation messages received from the at least two other network elements, and to set the weighted sum as the control variable, where synchronisation messages received from different network elements are located in logically separate buffer memories.

19. A method according to claim 13, wherein the method comprises adjusting the relative weight in the control variable of the information represented by synchronisation messages received from a second network element, which is one of the at least two other network elements, on the basis of information received from the second network element.

20. A method according to claim 13, comprising:

selecting from among synchronisation messages received from a second network element, which is one of the at least two other network elements, those that have transfer delays which belong to a predetermined portion of statistical distribution of the transfer delay, which portion includes the minimum value of the transfer delay, and setting the weight in the control variable of information represented by the selected synchronisation messages greater than the weight in the control variable of information represented by other synchronisation messages received from the second network element.

21. A method according to claim 20, wherein the method comprises producing a temporal mean of phase indicators formed on the basis of synchronisation messages received from the second network element, and to set the temporal mean of the phase indicators as a component in the control variable, the variation in the values of the phase indicators indicating the temporal change of the phase of the clock signal compared to the phase of the clock signal in the second network element.

22. A method according to claim 21, wherein the phase indicator corresponding to each received synchronisation message is one of the following:

difference between the value of the clock signal at the moment of reception of the synchronisation message and the time of day or its estimate of the transmission moment of the synchronisation message, delay time of the synchronisation message in the buffer memory of the first network element, or filling degree of the buffer memory storing the synchronisation message in the first network element.

23. A non-transitory computer readable medium encoded with a computer program for adjusting a clock signal in a network element of a communications network, the network element being arranged to receive synchronisation messages from at least two other network elements and comprising an adjustable clock signal source to provide the clock signal, the computer program comprising instructions readable by a programmable processor for making the programmable processor:

produce a control variable containing information about synchronisation messages received from the at least two other network elements, adjust the clock signal based on an arithmetic difference between the control variable and a reference value of the control variable, determine which portion of the reference value of the control variable corresponds to synchronisation messages received from each of the at least two other network elements, and in response to a situation where the reception from one of the at least two other network elements of synchronisation messages meeting a predetermined quality criterion ceases, change the reference value of the control variable by an amount equalling a portion of the reference value of the control variable, which portion corresponds to the network element from which the reception of synchronisation messages meeting the predetermined quality criterion has ceased.

* * * * *